US011993325B2

(12) United States Patent
Kitagawa (10) Patent No.: US 11,993,325 B2
(45) Date of Patent: May 28, 2024

(54) LEGGED MOBILE ROBOT, LEG CONTROL METHOD, AND PROGRAM STORAGE MEDIUM

(71) Applicant: NEC Corporation, Tokyo (JP)

(72) Inventor: Takeharu Kitagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 365 days.

(21) Appl. No.: 17/369,695

(22) Filed: Jul. 7, 2021

(65) Prior Publication Data
US 2022/0016775 A1 Jan. 20, 2022

(30) Foreign Application Priority Data
Jul. 16, 2020 (JP) .................................. 2020-121757

(51) Int. Cl.
B62D 57/032 (2006.01)
(52) U.S. Cl.
CPC .................................. B62D 57/032 (2013.01)
(58) Field of Classification Search
CPC ........ B62D 57/02; B62D 57/032; B25J 9/162; B25J 9/1664
See application file for complete search history.

(56) References Cited

U.S. PATENT DOCUMENTS

| 5,455,497 | A | * | 10/1995 | Hirose | ................. | B62D 57/032 318/568.22 |
| 5,758,734 | A | * | 6/1998 | Hong | .................... | B62D 57/02 901/1 |
| 7,600,591 | B2 | * | 10/2009 | Takenaka | ................. | F16F 1/44 180/8.6 |
| 9,381,961 | B1 | | 7/2016 | Kataoka et al. | | |
| 9,504,367 | B2 | * | 11/2016 | Kim | ..................... | G05D 1/0219 |
| 9,821,866 | B1 | * | 11/2017 | Urata | ......................... | B25J 5/00 |
| 9,833,903 | B1 | * | 12/2017 | Kuffner | ................. | B25J 9/1612 |
| 9,994,269 | B1 | * | 6/2018 | Urata | ................... | B62D 57/032 |
| 2007/0193789 | A1 | * | 8/2007 | Takenaka | ............ | B25J 19/0091 180/8.1 |

(Continued)

FOREIGN PATENT DOCUMENTS

| JP | 2004-025327 A | 1/2004 |
| JP | 2005-153038 A | 6/2005 |

(Continued)

OTHER PUBLICATIONS

JP Office Action for JP Application No. 2020-121757, mailed on Feb. 27, 2024 with English Translation.

*Primary Examiner* — Kevin Hurley
(74) *Attorney, Agent, or Firm* — Sughrue Mion, PLLC (57) ABSTRACT

A legged mobile robot includes at least two legs. The legs are movable in a front-rear direction of the legged mobile robot. Each of distal end portions of the legs is provided with a plurality of protrusions. Protruding directions of the protrusions are a plurality of directions including a lateral direction intersecting with the front-rear direction. The protrusions can come into contact with a moving surface on which the legs move. Further, the legged mobile robot includes a drive device that displaces each of the protrusions up down with respect to a sole in contact with the moving surface in the leg. The legged mobile robot further includes a control device that controls movement of the protrusions.

7 Claims, 8 Drawing Sheets

(56) References Cited

U.S. PATENT DOCUMENTS

2009/0200090 A1* 8/2009 Takanishi ............. B25J 19/0004
                                                            901/1
2020/0063501 A1* 2/2020 Jackson ............... B62D 57/032
2020/0324415 A1* 10/2020 Marvi ..................... B25J 9/065

FOREIGN PATENT DOCUMENTS

JP    2008-093822 A    4/2008
JP    2015-100904 A    6/2015

* cited by examiner

LEGGED MOBILE ROBOT, LEG CONTROL METHOD, AND PROGRAM STORAGE MEDIUM

This application is based upon and claims the benefit of priority from Japanese Patent Application No. 2020-121757, filed on Jul. 16, 2020, the disclosure of which is incorporated herein in its entirety by reference.

TECHNICAL FIELD

The present invention relates to a technique regarding a leg of a legged mobile robot.

BACKGROUND ART

In various fields, legged mobile robots such as bipedal walking robots have been being utilized. One of the problems of the legged mobile robots is to enable stable movement. Reference Document: JP 2008-93822 A discloses a foot support mechanism attached to a sole of a leg of a bipedal walking robot to enhance walking stability. The foot support mechanism includes a plurality of movable claw portions. A distal end portion of each of the movable claw portions serves as a ground contact portion that comes into contact with a walking surface on which the bipedal walking robot walks, and moves in an up-down direction according to an uneven shape of the walking surface when coming into contact with the ground, thereby suppressing an inclination of a foot caused by the unevenness of the walking surface. As a result, a situation in which the robot tilts and falls due to the unevenness of the walking surface is reduced.

Various techniques have been proposed to enhance the stability of movement of the legged mobile robots in addition to the technique described in Reference Document. A structure and operation control of a legged mobile robot tend to be complicated when attempting to improve the stability of movement of the legged mobile robot. However, considering versatility of the legged mobile robot, it is desirable that the structure and operation control of the legged mobile robot are simple.

SUMMARY

A main object of the present invention is to provide a technique for improving stability of movement of a legged mobile robot with a simple structure and operation control.

To achieve such an object, a legged mobile robot according to the present invention includes: as one aspect,
a plurality of legs movable in a front-rear direction;
a plurality of protrusions respectively protruding in a plurality of directions including at least a lateral direction intersecting with the front-rear direction from a distal end portion of each of the plurality of legs, and capable of coming into contact with a moving surface on which the legs move;
a drive device configured to displace each of the protrusions up and down with respect to a sole of each of the legs, the sole being a part in contact with the moving surface; and
a control device configured to control movement of each of the protrusions by controlling the drive device.

Further, a leg control method according to the present invention includes: as one aspect,
by a computer configuring a control device of a legged mobile robot including a plurality of legs movable in a front-rear direction, a plurality of protrusions respectively protruding in a plurality of directions including at least a lateral direction intersecting with the front-rear direction from a distal end portion of each of the plurality of legs, and capable of coming into contact with a moving surface on which the legs move, a drive device configured to displace each of the protrusions up and down with respect to a sole of each of the legs, the sole being a part in contact with the moving surface, and the control device configured to control movement of each of the protrusions by controlling the drive device,
controlling the drive device in such a way that, when a leg lands on the moving surface after moving in a direction away from the moving surface, the leg being included in the plurality of legs, no force is applied from the drive device to the protrusions of the landing leg; and
controlling the drive device to lock movement of the protrusions of the landing leg after the protrusions follow a shape of the moving surface by the landing of the leg.

Moreover, a program storage medium storing a computer program for causing, as one aspect, a computer configuring a control device of a legged mobile robot including a plurality of legs movable in a front-rear direction, a plurality of protrusions respectively protruding in a plurality of directions including at least a lateral direction intersecting with the front-rear direction from a distal end portion of each of the plurality of legs, and capable of coming into contact with a moving surface on which the legs move, a drive device configured to displace each of the protrusions up and down with respect to a sole of each of the legs, the sole being a part in contact with the moving surface, and the control device configured to control movement of each of the protrusions by controlling the drive device, to execute:
controlling the drive device in such a way that, when a leg lands on the moving surface after moving in a direction away from the moving surface, the leg being included in the plurality of legs, no force is applied from the drive device to the protrusions of the landing leg; and
controlling the drive device to lock movement of the protrusions of the landing leg after the protrusions follow a shape of the moving surface by the landing of the leg.

BRIEF DESCRIPTION OF THE DRAWINGS

Exemplary features and advantages of the present invention will become apparent from the following detailed description when taken with the accompanying drawings in which.

EXAMPLE EMBODIMENT

Hereinafter, example embodiments according to the present invention will be described with reference to the drawings.

FIRST EXAMPLE EMBODIMENT

Figure 1:
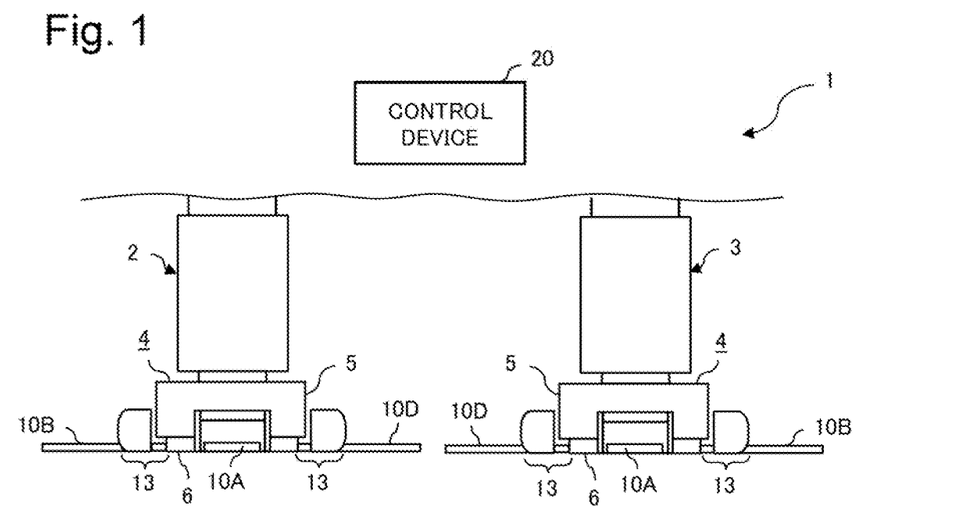
FIG. 1 is a schematic front view illustrating a configuration of legs of a bipedal walking robot that is a legged mobile robot according to a first example embodiment of the present invention.
Figure 2:
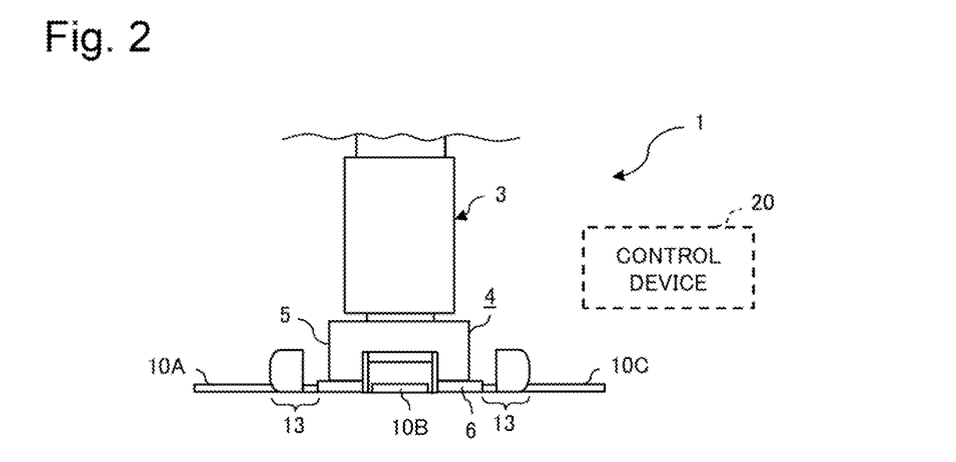
FIG. 2 is a schematic side view of a leg of the bipedal walking robot illustrated in FIG. 1.
Figure 3:
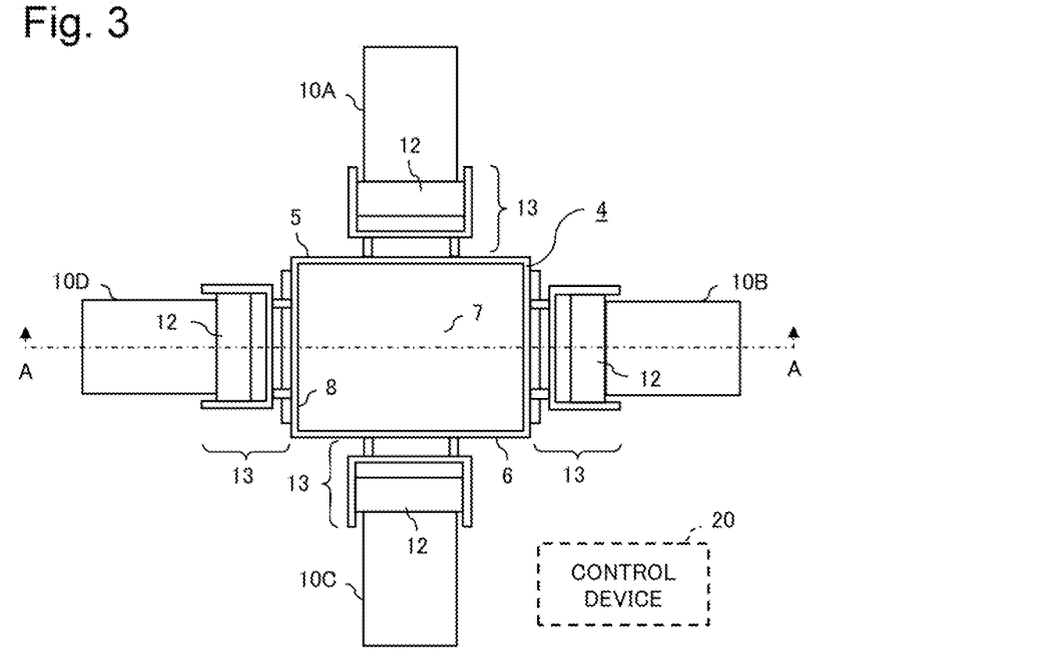
FIG. 3 is a schematic view for describing a sole of a leg of the bipedal walking robot illustrated in FIG. 1.
Figure 4:
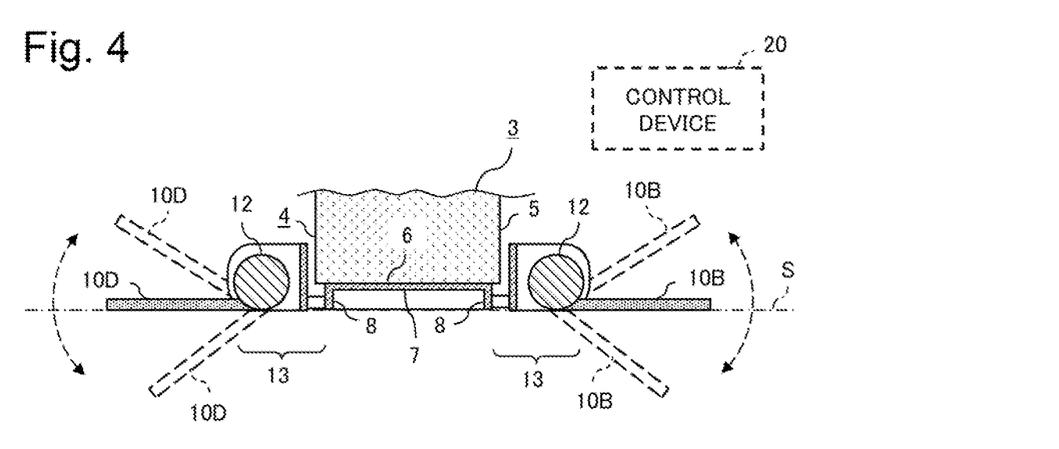
FIG. 4 is a schematic cross-sectional view of a distal end portion of the leg corresponding to an A-A portion of FIG. 3.

FIGS. 1 to 4 are views for describing a configuration of a distal end portion of a leg provided in a bipedal walking robot that is a legged mobile robot according to a first example embodiment of the present invention. That is, FIG. 1 is a schematic front view of legs 2 and 3 in a bipedal walking robot 1 of the first example embodiment. FIG. 2 is a schematic side view of the leg 3 in a case where the leg 3 is viewed from a right side in FIG. 1. FIG. 3 is a view schematically illustrating a back side (sole) of the distal end portion of the leg 3. FIG. 4 is a schematic cross-sectional view of the distal end portion (foot portion) of the leg 3 corresponding to an A-A portion of FIG. 3. Note that the legs 2 and 3 illustrated in FIGS. 1 and 2 are not the entire legs 2 and 3 but are portions corresponding to portions below knees in a human. Further, since the distal end portion of the leg 2 has a similar configuration to the distal end portion of the leg 3, illustration of the corresponding distal end portion of the leg 2 is omitted in FIGS. 3 and 4.

The bipedal walking robot 1 of the first example embodiment includes the two legs 2 and 3 as illustrated in FIGS. 1 to 4. Moreover, the bipedal walking robot 1 includes an upper body including a torso connected to the legs 2 and 3, and a head, an arm, and the like, but the configuration of the upper body is not limited here and description thereof is omitted.

A distal end portion (that is, an end portion opposite to an end portion connected to the torso) of the leg 2 or 3 forms a foot portion 4. Further, the leg 2 or 3 has a portion corresponding to an ankle, a shin, a knee, or a thigh of a human, and further includes a joint drive mechanism that moves a portion corresponding to a joint of the ankle, the knee, or the like of a human. In the first example embodiment, the configuration other than the foot portion 4 in the leg 2 or 3 is appropriately designed in consideration of the configuration of the upper body according to the use of the bipedal walking robot 1, and description thereof is omitted here.

The foot portion 4 includes a main body portion 5, a sole portion 6, finger portions 10A to 10D as protrusions, drive devices 12, and support members 13.

The main body portion 5 forms a main portion of the foot portion 4 constituting the distal end portion of the leg 2 or 3, and the sole portion 6 is provided on a back-side portion of the main body portion 5 that is a ground side to be grounded when the bipedal walking robot 1 moves on a walking surface that is a moving surface. The sole portion 6 has an aspect in which a peripheral edge portion of a plate member (for example, a metal plate) is bent downward (in a direction toward the walking surface) orthogonal to a plate surface 7 of the plate member to form a peripheral wall portion 8. A top part of the peripheral wall portion 8 in the sole portion 6 functions as a ground portion that is grounded to the walking surface. Here, the term "orthogonal" includes a case that can be regarded as orthogonal, and a bending angle of the peripheral wall portion 8 with respect to the plate surface 7 is an angle within an angle range from 65 degrees to 115 degrees including 90 degrees, for example.

Each of the finger portions 10A to 10D is connected to the main body portion 5 (sole portion 6) via the drive device 12 and the support member 13. The finger portions 10A to 10D are respectively provided to protrude from the main body portion 5 in four directions toward the front, the back, the inside (a region between the legs 2 and 3), and the outside (a region opposite to the inside) when viewed from the main body portion 5. In other words, the finger portions 10A to 10D have an aspect of being provided at the distal end portion of the leg 2 or 3 and protruding in directions different from one another and along the walking surface. Further, portions of the finger portions 10A to 10D, the portions facing the walking surface during walking, form a planar shape. Hereinafter, this planar portion is also referred to as a back finger surface.

Such finger portions 10A to 10D are individually connected to the related drive devices 12, and the support members 13 support and fix such drive devices 12 to the main body portion 5. Note that the configuration of support member 13 is not limited as long as the support member 13 can support and fix the drive device 12 to the main body portion 5. Here, description of the configuration of the support member 13 is omitted.

The drive devices 12 are, for example, motors, and displace and drive the related finger portions 10A to 10D, as illustrated by the dotted lines in FIG. 4. That is, in the first example embodiment, a position of a sole surface S (see FIG. 4) serving as a reference of the sole is determined by the top part of the peripheral wall portion 8 of the sole portion 6. The drive devices 12 displace and drive the finger portions 10A to 10D up and down with respect to the sole surface S.

Figure 5:
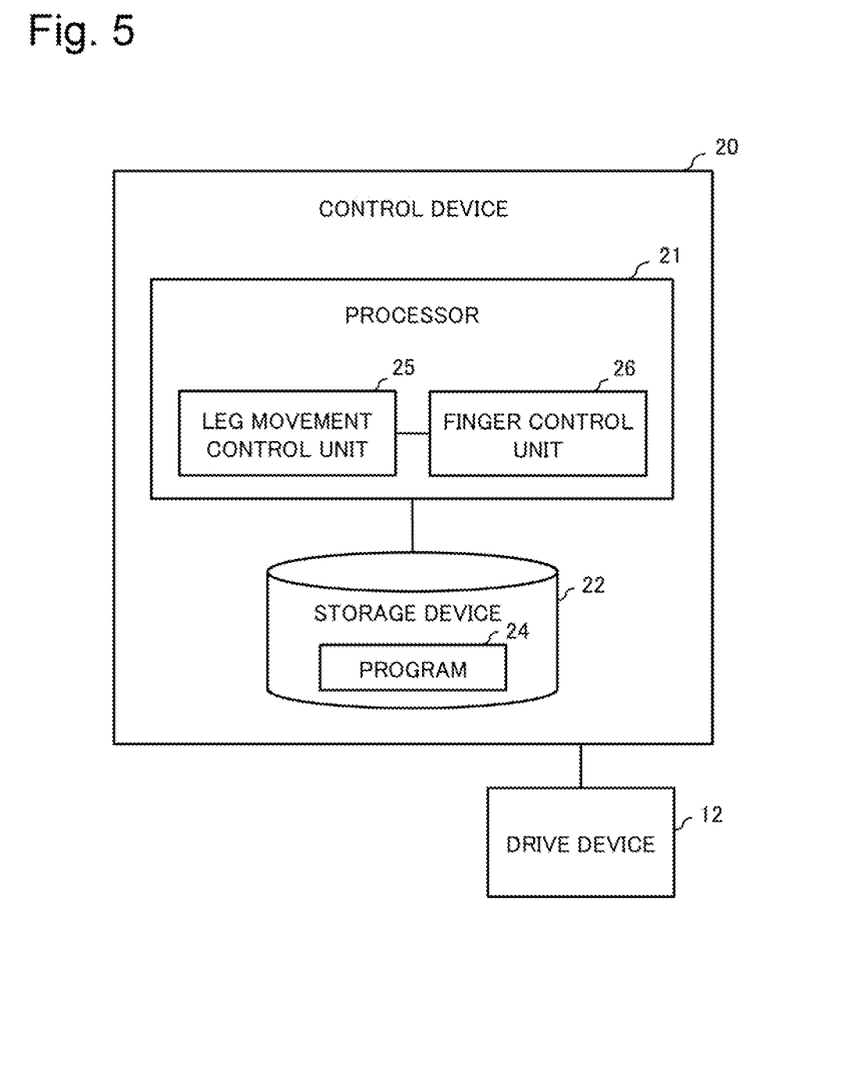
FIG. 5 is a block diagram for describing a control configuration of a control device that controls movement of a finger portion that is a protrusion of a leg according to the first example embodiment.

The bipedal walking robot 1 further includes a control device 20 that controls an operation of the drive device 12. FIG. 5 is a block diagram illustrating a functional configuration of the control device 20. The control device 20 includes a processor 21 such as a central processing unit (CPU) and a storage device 22. The storage device 22 is a storage medium that stores a computer program (hereinafter also referred to as a program) 24, data used for processing of the processor 21, and the like. There are various types of storage devices such as a magnetic disk device and a semiconductor memory, and here, any type of storage device may be adopted as the storage device 22. Further, a plurality of types of storage devices may be provided in the control device 20. Here, in a case where a plurality of types of storage devices is provided, the storage devices are collectively referred to as the storage device 22.

The processor 21 can have a function based on the program 24 by reading the program 24 from the storage device 22 and executing the program 24. In the first example embodiment, the processor 21 includes a leg movement control unit 25 and a finger control unit 26 as functional units. The leg movement control unit 25 has a function to control leg movement that is movement of the legs 2 and 3 regarding walking by controlling movement of the joint drive mechanism corresponding to the joint of the ankle, knee, or crotch of a human. Here, a control method related to the leg movement is a method appropriately selected in consideration of various matters such as structures, shapes, and weights of the legs 2 and 3 and the upper body, and description thereof is omitted here.

The finger control unit 26 has a function to control the movement of the finger portions 10A to 10D by controlling the operation of the drive devices 12. For example, when the bipedal walking robot 1 walks, the finger control unit 26 controls the movement of the finger portions 10A to 10D in conjunction with the control operation of the leg movement control unit 25.

Figure 6:
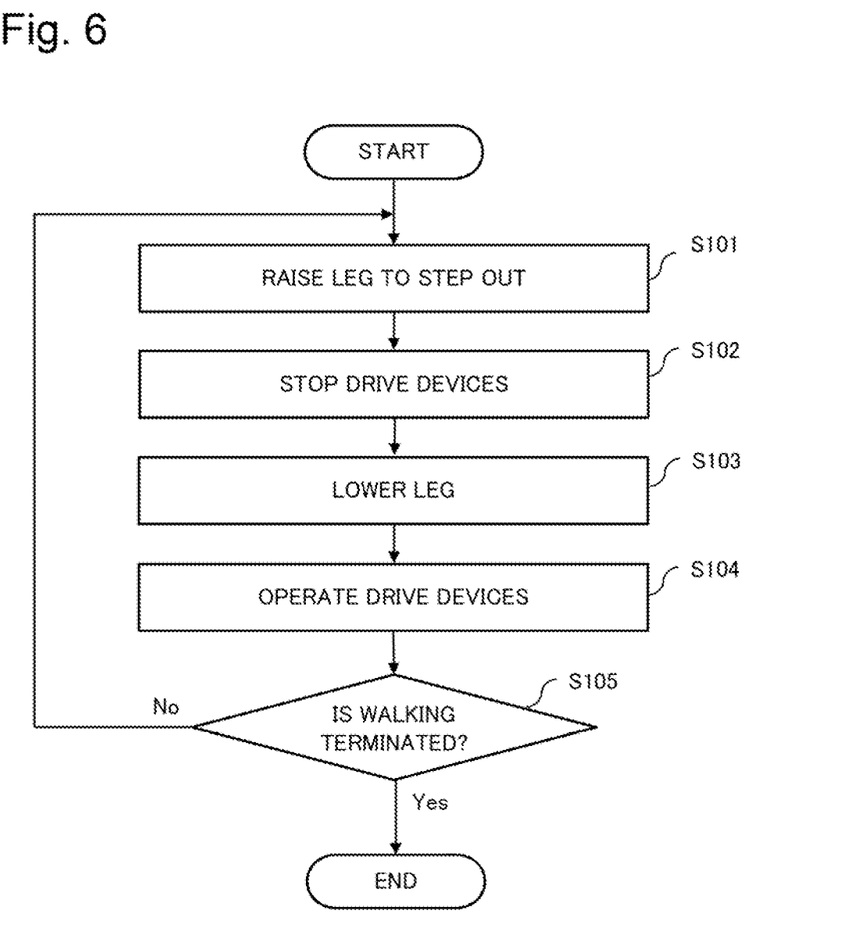
FIG. 6 is a flowchart for describing an example of a control operation of the finger portion of the control device according to the first example embodiment.

FIG. 6 is a flowchart illustrating an example of operation control of the finger portions 10A to 10D during bipedal walking in the control device 20. For example, it is assumed that the leg movement control unit 25 of the control device 20 raises the leg 2 by controlling the operation of the joint drive mechanism for the knee, crotch, or the like in order to cause one of the legs 2 and 3 (here, the leg 2) to step out (step S101). At this time, the finger control unit 26 stops all the drive devices (motors) 12 of the foot portion 4 of the leg 2 that steps out (step S102). As a result, the finger portions 10A to 10D of the leg 2 are in a state where no force is applied from the drive devices 12 (a state where the strength is lost), and are lowered downward from the sole surface S by gravity.

Figure 7:
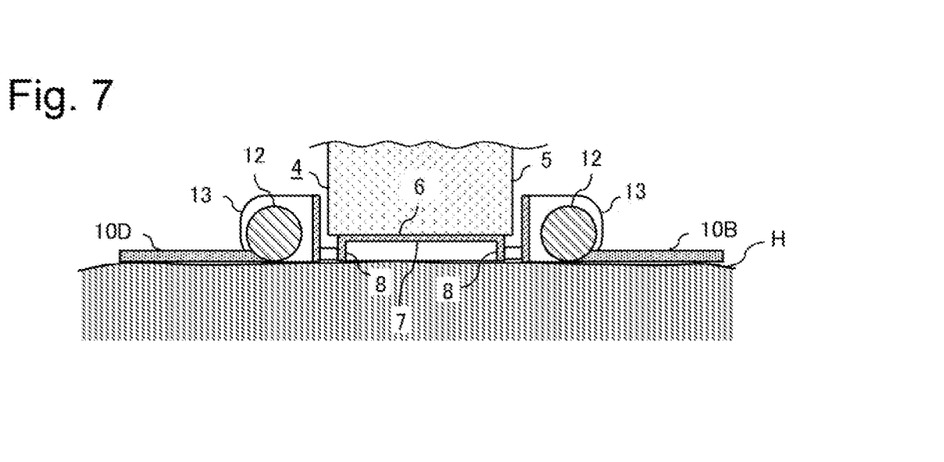
FIG. 7 is a schematic cross-sectional view for describing an example of the distal end portion of the leg when the leg lands in the first example embodiment.
Figure 8:
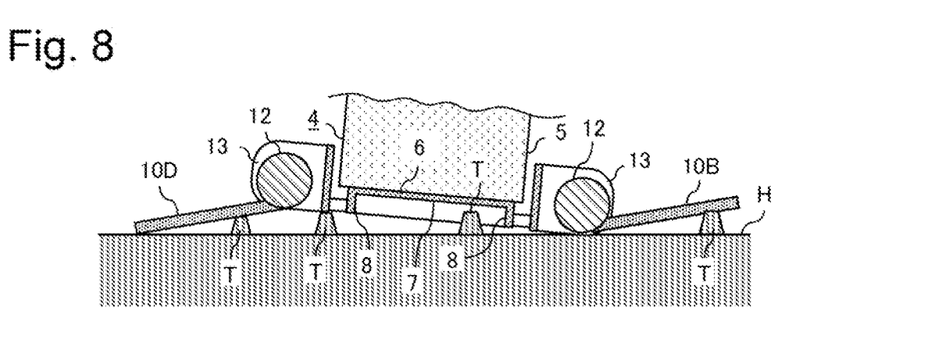
FIG. 8 is a schematic cross-sectional view for describing another example of the distal end portion of the leg when the leg lands in the first example embodiment.

Thereafter, the leg movement control unit 25 controls the operation of the joint drive mechanism to lower the leg 2 in a stepping direction (step S103). Then, when the leg 2 lands, the finger portions 10A to 10D follow the shape of the walking surface at landing points. As a result, in a case where the walking surface is a smooth surface without unevenness or a surface with small unevenness, the back finger surfaces of the finger portions 10A to 10D come into a planar contact with or come into a state close to the planar contact with the walking surface H, as illustrated in the cross-sectional view of FIG. 7. Further, in a case where the walking surface H has projections T as illustrated in the cross-sectional view of FIG. 8, and when the leg 2 lands, the back finger surfaces of the finger portions 10A to 10D come into states following the presence or absence of the projections T at the landing points, and the heights and arrangement positions of the projections T. In this case, the back finger surfaces of the finger portions 10A to 10D are in planar contact with the walking surface H, in point contact with apexes of the projections T, or end edge parts of the projections T are in a line contact with the walking surface H according to the presence or absence of the projections T and the heights and arrangement positions of the projections T.

Thereafter, the finger control unit 26 locks the movement of the finger portions 10A to 10D, that is, causes the fingers to be filled with strength, by operating all the drive devices 12 of the foot portion 4 of the leg 2 (step S104). Note that it is conceivable to determine timing when the finger control unit 26 operates the drive devices 12, using an output of a sensor that detects the movement of the leg 2 or 3. However, here, the timing is determined without using the sensor. For example, since an approximate time required from the start of the lowering operation after raising the leg 2 to step out to the landing of the leg 2 is obtained in advance, the time from the start of the lowering operation of the leg 2 to operating the drive devices 12 is set on the basis of the obtained time. The finger control unit 26 operates the drive devices 12 when an elapsed time from the start of lowering the leg 2 reaches the set time.

Thereafter, the control device 20 determines whether to terminate the walking (step S105), and in a case where the walking is not terminated (the walking is continued), the leg movement control unit 25 and the finger control unit 26 repeat the operations in and after step S101 for the leg 3 instead of the leg 2 to cause another leg 3 to step out.

Figure 9:
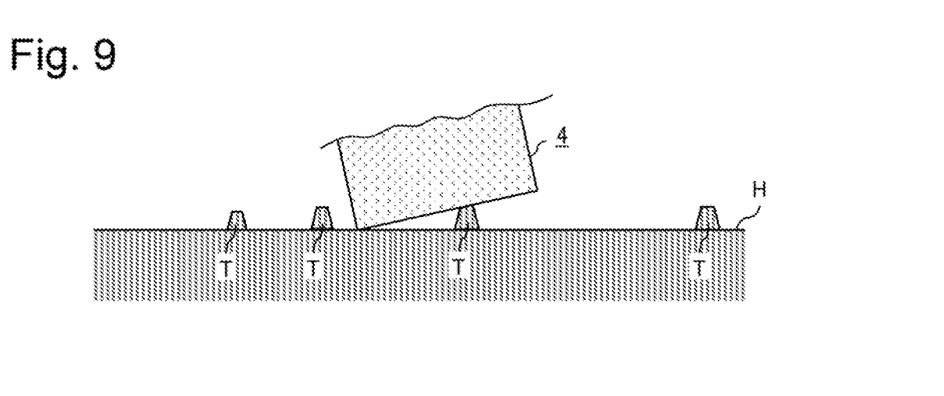
FIG. 9 is a view illustrating a comparative example with respect to the distal end portion of the leg in FIG. 8.

The bipedal walking robot 1 of the first example embodiment is configured as described above. That is, the bipedal walking robot 1 includes the plurality of finger portions 10A to 10D and is configured to control the operation of the drive devices 12 in such a way that the finger portions 10A to 10D can follow the shapes of the landed points when the leg 2 or 3 has landed. Thereby, the bipedal walking robot 1 can increase a contact area (contact points) between the foot portion 4 and the walking surface H when the leg 2 or 3 has landed in not only a case where the walking surface H is smooth or less uneven but also a case where the walking surface H is uneven or has projections, as compared with a case without such finger portions 10A to 10D. FIG. 9 is a comparative example with FIG. 8 in a case where the foot portion 4 is not provided with the finger portions 10A to 10D. As can be seen from the comparison between FIG. 8 and FIG. 9, the bipedal walking robot 1 of the first example embodiment can increase the contact points between the foot portion 4 and the walking surface H when landing.

Further, the finger portions 10A to 10D protrude not only in a traveling direction of the bipedal walking robot 1 but also a backward direction and the lateral direction intersecting with the front-rear direction. Further, the operation control to lock the finger portions 10A to 10D is performed by operating the drive devices 12 after the leg 2 or 3 lands.

The bipedal walking robot 1 of the first example embodiment can enhance the stability of bipedal walking by the configuration of the finger portions 10A to 10D and the operation control thereof as compared with a case where the finger portions 10A to 10D are not provided. Furthermore, the operation control of the finger portions 10A to 10D is simple control such as stopping the drive devices 12 when raising the leg 2 or 3, and operating the drive devices 12 when the leg 2 or 3 lands, so complication of the control operation can be suppressed.

Moreover, the drive devices 12 that operate the finger portions 10A to 10D are provided in the foot portion 4, and the center of gravity of the bipedal walking robot 1 is lowered by the weight of the drive devices 12, which is also a factor of enhancing the stability of bipedal walking of the bipedal walking robot 1.

Moreover, the foot portion 4 is provided with the sole portion 6, and the sole portion 6 has a recess shape opened to the walking surface side. For this reason, part or the entire projection on the walking surface is accommodated in the recessed space of the sole portion 6, whereby the inclination of the leg 2 or 3 due to the projection is reduced, and the bipedal walking robot 1 is prevented from falling over.

SECOND EXAMPLE EMBODIMENT

Hereinafter, a second example embodiment according to the present invention will be described. In the description of the second example embodiment, the same name parts as the configuration parts of the bipedal walking robot as the legged mobile robot of the first example embodiment are given the same reference numerals, and redundant description of the common parts is omitted.

Figure 10:
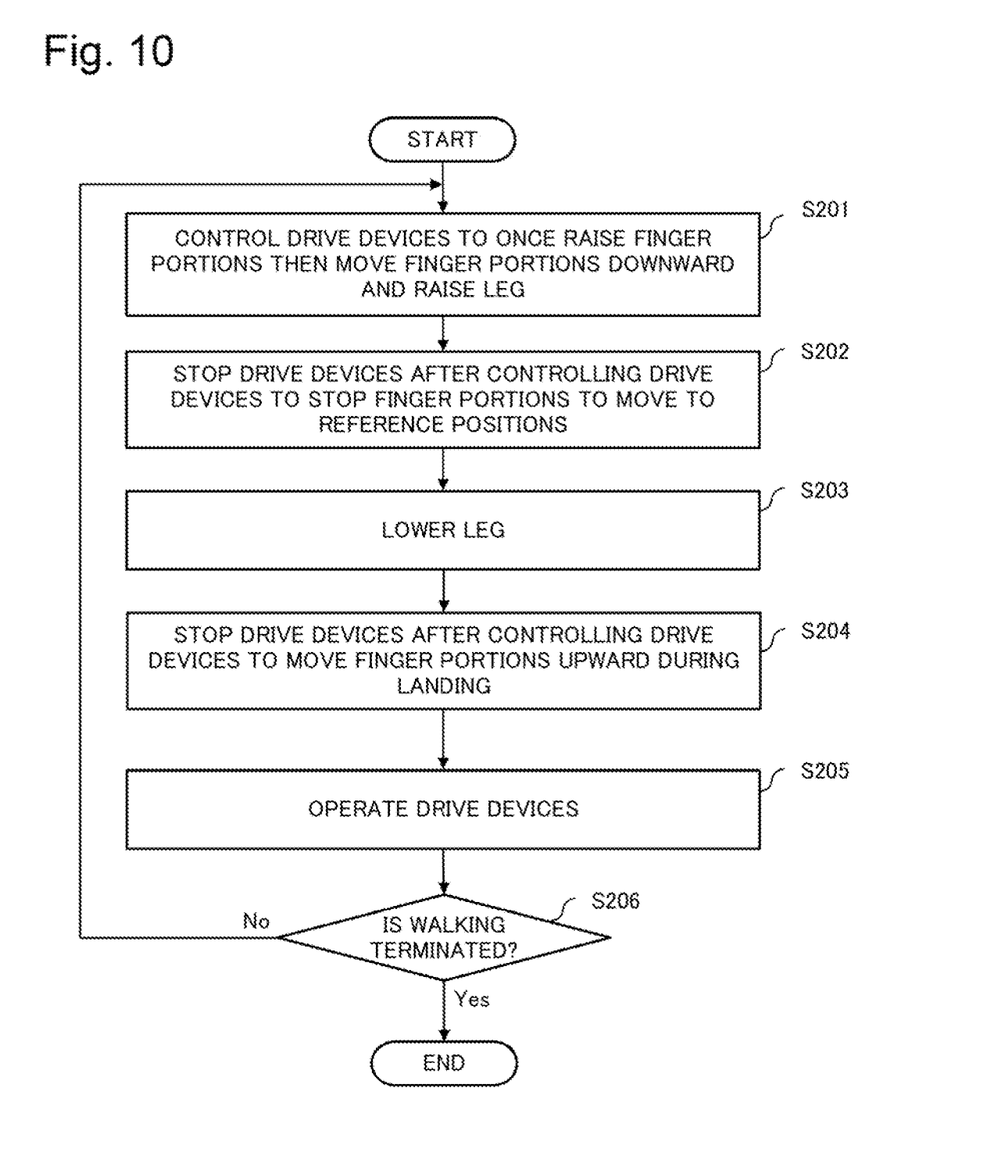
FIG. 10 is a flowchart for describing an example of a control operation of a finger portion of a control device according to a second example embodiment of the present invention.

A bipedal walking robot 1 of the second example embodiment has a configuration including finger portions 10A to 10D and drive devices 12 similar to that of the first example embodiment, and a finger control unit 26 of a control device 20 controls operation of the finger portions 10A to 10D in conjunction with a control operation of a leg movement control unit 25 as follows when walking. FIG. 10 is a flowchart illustrating an example of operation control of the finger portions 10A to 10D during bipedal walking of the control device 20 according to the second example embodiment.

In the second example embodiment, the finger control unit 26 of the control device 20 drives all the drive devices 12 of a foot portion 4 of a leg that steps out (here, a leg 2), once raises the finger portions 10A to 10D, and then moves the finger portions downward. At this time, the finger control unit 26 controls the drive devices 12 so that the finger portions 10A to 10D press a walking surface by the downward movement of the finger portions 10A to 10D. Further, the leg movement control unit 25 controls a joint drive mechanism to raise the leg 2 that steps out in addition to such a control operation of the finger control unit 26 (step S201). By the control operations of the leg movement control unit 25 and the finger control unit 26, the leg 2 is lifted by a reaction force from the walking surface due to the finger portions 10A to 10D pressing the walking surface in addition to a force in a lifting direction by the joint drive mechanism.

In the state where leg 2 is raised, the finger control unit 26 controls the drive devices 12 to move positions of the finger portions 10A to 10D to predetermined reference positions. Here, the reference positions of the finger portions 10A to 10D are positions along a sole surface S defined by a top part of a peripheral wall portion 8 of a sole portion 6 in the foot portion 4. Then, the finger control unit 26 stops the drive devices 12 (step S202).

Thereafter, the leg movement control unit 25 controls the operation of the joint drive mechanism to lower the leg 2 in a stepping direction (step S203).

Thus, when the leg 2 lands, the finger control unit 26 controls the drive devices 12 to move the finger portions 10A to 10D upward. Due to the upward movement of the finger portions 10A to 10D, when there is a projection on the walking surface, impact from the projection on the finger portions 10A to 10D is alleviated. Then, the finger control unit 26 stops all the drive devices (motors) 12 of the foot portion 4 of the leg 2 (step S204). As a result, the finger portions 10A to 10D of the leg 2 are in a state where no force is applied from the drive devices 12 (a state where the strength is lost), and follow the shape of the walking surface. Then, the finger control unit 26 locks the movement of the finger portions 10A to 10D, that is, causes the fingers to be filled with strength, by operating all the drive devices 12 of the foot portion 4 of the leg 2 (step S205).

Thereafter, the control device 20 determines whether to terminate the walking (step S206), and in a case where the walking is not terminated (the walking is continued), the leg movement control unit 25 and the finger control unit 26 repeat the operations in and after step S201 for the leg 3 instead of the leg 2 to cause another leg 3 to step out.

Note that an output of a sensor for detecting the movement of the leg 2 or 3 may be used for the timing when the finger control unit 26 determines the stop and operation of the drive devices 12. However, here, the output of a sensor is not used, and the timing is determined similarly to the first example embodiment.

Configurations other than the above in the bipedal walking robot 1 of the second example embodiment are similar to those of the bipedal walking robot 1 of the first example embodiment.

Since the bipedal walking robot 1 of the second example embodiment includes the finger portions 10A to 10D and the control configuration to cause the finger portions 10A to 10D to follow the shape of the walking surface when the leg 2 or 3 lands, the bipedal walking robot 1 of the second example embodiment can exert effects similar to the first example embodiment. Further, the bipedal walking robot 1 of the second example embodiment has a configuration of using the reaction force from the walking surface by the finger portions 10A to 10D when raising the leg that steps out. As a result, the bipedal walking robot 1 can speed up the movement of the legs 2 and 3 during walking.

OTHER EXAMPLE EMBODIMENTS

The present invention is not limited to the first and second example embodiments, and various example embodiments can be adopted. For example, in the first and second example embodiments, the finger control unit 26 similarly controls the operations of all the finger portions 10A to 10D. Instead, the finger control unit 26 may not operate the finger portions 10A to 10D in the same manner. For example, in a case where the bipedal walking robot 1 is provided with a sensor that detects an inclination, it is assumed that the bipedal walking robot 1 is detected to be inclined by a threshold value or more on the basis of an output of the sensor. In this case, the finger control unit 26 may control the drive devices 12 to apply a pressing force to the walking surface from the finger portion associated with an inclined direction among the finger portions 10A to 10D.

Further, it is assumed that the bipedal walking robot 1 includes a camera, and further has a function to detect a state (unevenness, presence or absence of a step, softness/hardness of a surface such as a sandy surface, a grass surface, or a pavement surface, or the like) of the walking surface from a video of the walking surface captured by the camera. In such a case, an operation control procedure after landing of each leg of the finger portions 10A to 10D according to the state of the walking surface may be determined in advance and given to the control device 20, and the finger control unit 26 may control the operations of the finger portions 10A to 10D according to the detected state of the walking surface after landing of the leg 2 or 3.

Further, in the first and second example embodiments, each of the legs 2 and 3 is provided with the four finger portions 10A to 10D. Instead, the number of protrusions provided in the leg may be three, or equal to or more than five, in consideration of various matters such as the state of the moving surface where the bipedal walking robot 1 is assumed to move, and the structure of the upper body of the bipedal walking robot 1. However, at least one of the protrusions protrudes from the leg in a lateral direction intersecting with a front-rear direction in which the leg moves.

Further, in the first and second example embodiments, the legs 2 and 3 are provided with the joint drive mechanism corresponding to a human ankle, and the protrusion is provided in the foot portion 4 on the distal end side of the joint drive mechanism. Instead, the legs 2 and 3 may not be provided with the joint drive mechanism corresponding to a human ankle, and may be provided with protrusions protruding from distal end portions of the legs 2 and 3 in a plurality of directions including at least the lateral direction intersecting with the front-rear direction.

Moreover, in the first and second example embodiments, the bipedal walking robot is described as an example of the legged mobile robot, but the present invention is also applicable to a mobile robot having equal to or more than three legs.

Figure 11:
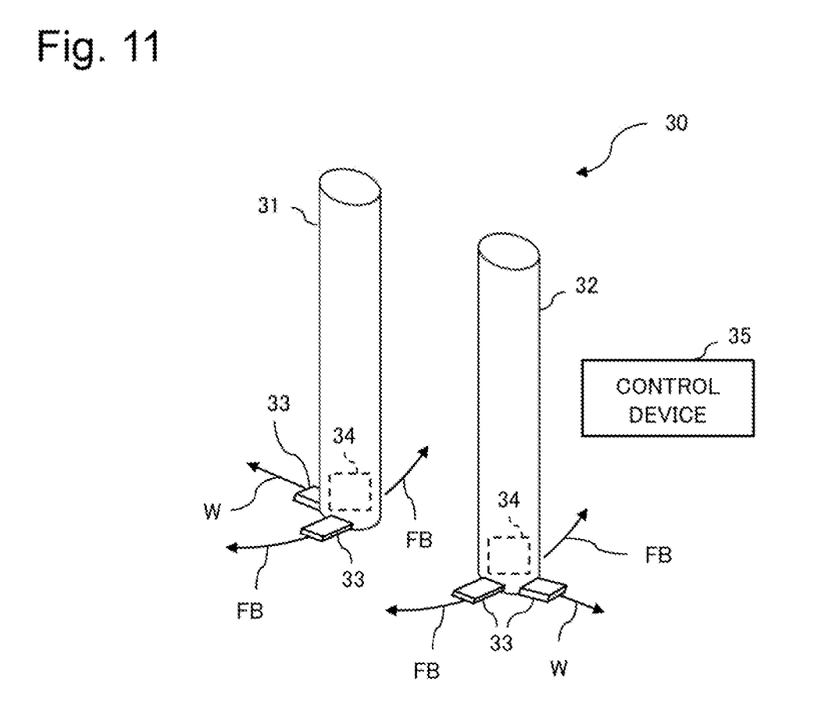
FIG. 11 is a diagram illustrating one of other example embodiments according to the present invention.

FIG. 11 is a diagram illustrating a basic configuration of the legged mobile robot according to the present invention. A legged mobile robot 30 illustrated in FIG. 11 includes at least two legs 31 and 32. The legs 31 and 32 are movable in both the front and rear directions (in other words, front-rear direction FB) of the legged mobile robot 30, and the legged mobile robot 30 moves by the movement of the legs 31 and 32. The movement here is not limited to walking, and includes running and moving.

Each of the legs 31 and 32 is provided with a plurality of protrusions 33 protruding from a distal end portion of the leg. Protruding directions of the protrusions 33 are a plurality of directions including a lateral direction W intersecting with the front-rear direction FB. The protrusions 33 can come into contact with a moving surface on which the legs 31 and 32 move. Note that the lateral direction W is not limited to the direction orthogonal to the front-rear direction FB, and for example, an intersection angle between the lateral direction W and the front-rear direction FB may be, for example, 45 degrees.

Further, the legged mobile robot 30 includes a drive device 34. The drive device 34 is a device that displaces each of the protrusions 33 up and down with respect to a sole in contact with the moving surfaces of the leg 31 or 32.

Furthermore, the legged mobile robot 30 includes a control device 35. The control device 35 includes, for example, a central processing unit (CPU), and has a function to control the movement of the protrusions 33 by controlling the operation of the drive device 34.

Figure 12:
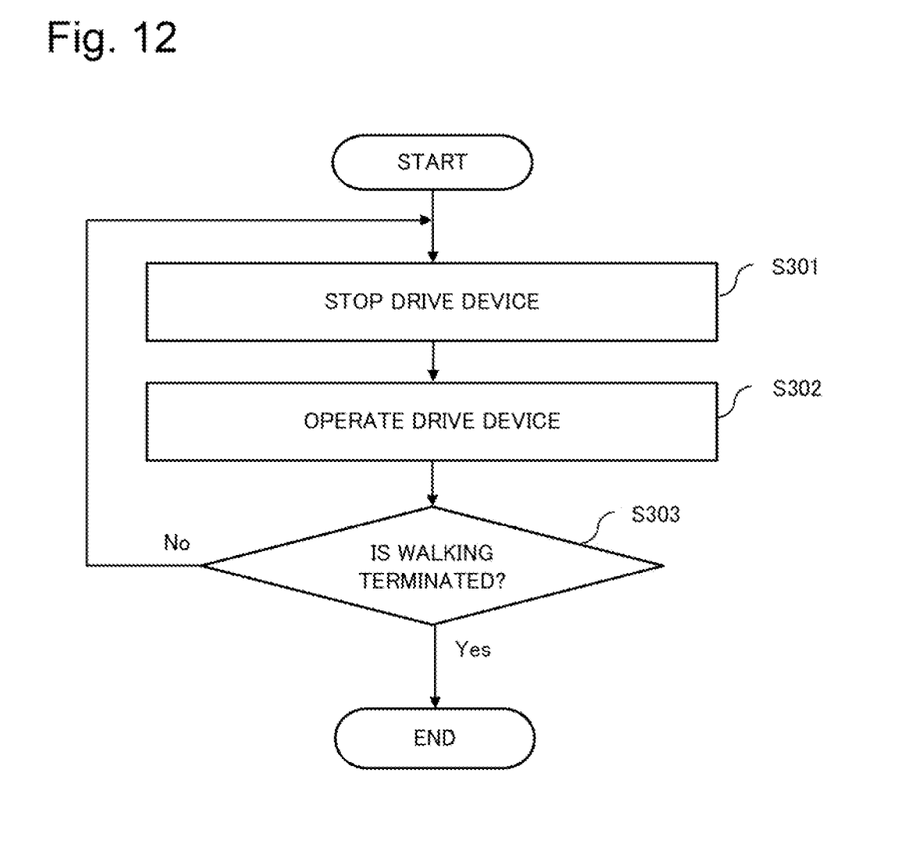
FIG. 12 is a flowchart for further describing the one of other example embodiments according to the present invention.

FIG. 12 is a flowchart illustrating an example of operation control of the protrusions 33 by the control device 35. For example, the control device 35 stops the drive device 34 when one (here, the leg 31) of the legs 31 and 32 moves in a direction away from the moving surface and then moves toward the moving surface (step S301). As a result, no force is applied from the drive device 34 to the protrusions 33 when the leg 31 lands. When the leg 31 lands in such a state, the protrusions 33 of the leg 31 follows the shape of the moving surface.

Thereafter, the control device 35 operates the drive device 34 to lock the movement of the protrusions 33 in the state of following the shape of the moving surface (step S302). Thereafter, the control device 35 determines whether the legged mobile robot 30 terminates the movement (step S303). Then, in a case where the movement is not terminated (that is, the movement is continued), another leg 32 is operated instead, and the control device 35 repeats the operation in and after step S301 to control the movement of the protrusions 33 of the leg 32 in accordance with the movement of the leg 32.

The legged mobile robot 30 illustrated in FIG. 11 includes the plurality of protrusions 33 including the protrusion 33 protruding in at least the lateral direction W from the distal end portion of the leg 31 or 32, and controls the operation as illustrated in FIG. 12 for the protrusions 33. As a result, the effect that the legged mobile robot 30 can enhance the stability of the movement by the simple structure and operation control can be obtained.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A legged mobile robot comprising:
   a plurality of legs movable in a front-rear direction, each of the plurality of legs including a sole with a recess shape that is open to a moving surface on which the plurality of legs move;
   a plurality of protrusions respectively protruding in a plurality of directions including at least a lateral direction intersecting with the front-rear direction from a distal end portion of each of the plurality of legs, and capable of coming into contact with the moving surface;
   a drive device configured to displace each of the protrusions up and down with respect to the sole of each of the legs, the sole being a part in contact with the moving surface; and
   a control device configured to control movements of each of the protrusions by controlling the drive device.

2. The legged mobile robot according to claim 1, wherein the control device controls the drive device in such a way that, when at least one of the legs of the plurality of legs lands on the moving surface after moving in a direction away from the moving surface, no force is applied from the drive device to the protrusions of the landing leg, and the control device controls the drive device to lock movements of the protrusions of the landing leg after the protrusions follow a shape of the moving surface by the landing of the leg.

3. The legged mobile robot according to claim 1, wherein the control device controls the drive device in such a way that, when at least one of the legs of the plurality of legs moves in a direction away from the moving surface, the protrusions of the moving leg press the moving surface.

4. The legged mobile robot according to claim 1, wherein the protrusions have a planar portion that is in planar contact with the moving surface.

5. The legged mobile robot according to claim 1, wherein the number of the legs is two, and the legged mobile robot performs bipedal walking with the two legs.

6. A leg control method comprising:
   by a computer configuring a control device of a legged mobile robot including a plurality of legs movable in a front-rear direction, each of the plurality of legs including a sole with a recess shape that is open to a moving surface on which the plurality of legs move;
   a plurality of protrusions respectively protruding in a plurality of directions including at least a lateral direction intersecting with the front-rear direction from a distal end portion of each of the plurality of legs, and capable of coming into contact with the moving surface,
   a drive device configured to displace each of the protrusions up and down with respect to the sole of each of the legs, the sole being a part in contact with the moving surface, and the control device configured to control movements of each of the protrusions by controlling the drive device, controlling the drive device in such a way that, when at least one of the legs of the plurality of legs lands on the moving surface after moving in a direction away from the moving surface, no force is applied from the drive device to the protrusions of the landing leg; and controlling the drive device to lock movements of the protrusions of the landing leg after the protrusions follow a shape of the moving surface by the landing of the leg.

7. A non-transitory program storage medium storing a computer program for causing a computer configuring a control device of a legged mobile robot including a plurality of legs movable in a front-rear direction, each of the plurality of legs including a sole with a recess shape that is open to a moving surface on which the plurality of legs move;

a plurality of protrusions respectively protruding in a plurality of directions including at least a lateral direction intersecting with the front-rear direction from a distal end portion of each of the plurality of legs, and capable of coming into contact with the moving surface, a drive device configured to displace each of the protrusions up and down with respect to the sole of each of the legs, the sole being a part in contact with the moving surface, and the control device configured to control movements of each of the protrusions by controlling the drive device, to execute:

controlling the drive device in such a way that, when at least one of the legs of the plurality of legs lands on the moving surface after moving in a direction away from the moving surface, no force is applied from the drive device to the protrusions of the landing leg; and controlling the drive device to lock movements of the protrusions of the landing leg after the protrusions follow a shape of the moving surface by the landing of the leg.

* * * * *